(12) United States Patent
Gulliksson et al.

(10) Patent No.: US 10,154,117 B2
(45) Date of Patent: Dec. 11, 2018

(54) END-UNDER DEVICES HANDLING OBJECTS VIA NETWORK SERVER ASSISTANCE

(71) Applicant: Sony Corporation, Tokyo (JP)

(72) Inventors: Johan Gulliksson, Bjärred (SE); Henrik Strand, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 294 days.

(21) Appl. No.: 14/426,868

(22) PCT Filed: Apr. 30, 2014

(86) PCT No.: PCT/IB2014/061122
§ 371 (c)(1),
(2) Date: Mar. 9, 2015

(87) PCT Pub. No.: WO2015/166304
PCT Pub. Date: Nov. 5, 2015

(65) Prior Publication Data
US 2016/0261718 A1    Sep. 8, 2016

(51) Int. Cl.
*H04L 29/06* (2006.01)
*G06F 9/50* (2006.01)

(52) U.S. Cl.
CPC ............ *H04L 67/42* (2013.01); *G06F 9/5044* (2013.01)

(58) Field of Classification Search
CPC ............................... H04L 67/42; G06F 9/5044
USPC ........................................................ 709/203
See application file for complete search history.

(56) References Cited

U.S. PATENT DOCUMENTS

| 8,527,659 | B2 * | 9/2013 | Deprun ................... H04L 12/66 370/328 |
| 2007/0067310 | A1 | 3/2007 | Gupta et al. |
| 2012/0159506 | A1 | 6/2012 | Barham et al. |
| 2014/0095683 | A1 * | 4/2014 | Knowles ............... H04L 67/303 709/223 |
| 2014/0108506 | A1 * | 4/2014 | Borzycki ................ H04L 67/10 709/203 |

OTHER PUBLICATIONS

Sohn et al., Supporting Unplanned Activities Through Cross-Device Interaction, Nov. 11-12, 2010, AutomotiveUI 2010 (2 pages).*

(Continued)

*Primary Examiner* — Wing F Chan
*Assistant Examiner* — Leon Y Tseng
(74) *Attorney, Agent, or Firm* — Tucker Ellis LLP

(57) ABSTRACT

A network server creates a database storing a list of end-user devices associated with a user, object types that can be handled by the respective end-user devices, and actions that can be performed by the respective end-user devices for handling objects of the respective object types. One of the end-user devices detects that it is unable to handle an object and makes a request to the network server that a different, unspecified device handle the object instead. The network server, having received the request that an unspecified device handle the object, selects a device associated with the user to handle the object based on the database, and invokes that device.

18 Claims, 11 Drawing Sheets

| DEVICE ID | MODEL | PHONE | GPS | SCREEN | USER |
|---|---|---|---|---|---|
| 0 | XPERIA Z ULTRA SMARTPHONE | YES | YES | 6.4 | BOB |
| 1 | XPERIA TABLET Z | NO | NO | 10.1 | BOB |
| 2 | VAIO TAP 11 TABLET | NO | NO | 11.6 | BOB |

| DEVICE ID | OBJECT TYPE | ACTION |
|---|---|---|
| 0 | PHONE NUMBER | DIAL |
| 0 | ADDRESS | LOCATE ON MAP |
| 0 | ADDRESS | NAVIGATE TO |
| 0 | VIDEO | PLAY |
| 1 | ADDRESS | LOCATE ON MAP |
| 1 | VIDEO | PLAY |
| 2 | ADDRESS | LOCATE ON MAP |
| 2 | VIDEO | PLAY |

(56) References Cited

OTHER PUBLICATIONS

Huerta-Canepa, G., et al., "A Virtual Cloud Computing Provider for Mobile Devices", Proceedings of the 1st ACM Workshop on Mobile Cloud Computing & Services Social Networks and Beyond, MCS '10, Jan. 1, 2010, pp. 1-5, New York, New York, USA, XP055122445.
International Search Report dated Jan. 23, 2015 in re International Application No. PCT/IB2014/061222 filed Apr. 30, 2014.

\* cited by examiner

200

| DEVICE ID | MODEL | PHONE | GPS | SCREEN | USER |
|---|---|---|---|---|---|
| 0 | XPERIA Z ULTRA SMARTPHONE | YES | YES | 6.4 | BOB |
| 1 | XPERIA TABLET Z | NO | NO | 10.1 | BOB |
| 2 | VAIO TAP 11 TABLET | NO | NO | 11.6 | BOB |

| DEVICE ID | OBJECT TYPE | ACTION |
|---|---|---|
| 0 | PHONE NUMBER | DIAL |
| 0 | ADDRESS | LOCATE ON MAP |
| 0 | ADDRESS | NAVIGATE TO |
| 0 | VIDEO | PLAY |
| 1 | ADDRESS | LOCATE ON MAP |
| 1 | VIDEO | PLAY |
| 2 | ADDRESS | LOCATE ON MAP |
| 2 | VIDEO | PLAY |

FIG. 3

END-UNDER DEVICES HANDLING OBJECTS VIA NETWORK SERVER ASSISTANCE

TECHNICAL FIELD

The present invention relates generally to the handling of objects by computing devices, and more particularly to using a network server to assist an end-user device with handling an object by invoking a different end-user device to handle the object.

BACKGROUND

A modern user of computing devices will often have more than one kind of computing device. It is not uncommon for a user to regularly use a smartphone, a tablet, a laptop, a workstation, a smart television, and so on. Although these devices are often at least marginally functional for handling the varying types of objects a user may encounter (e.g., videos, pictures, audio, addresses, phone numbers, contacts, calendar entries, hyperlinks), different types of end-user devices will often have different strengths that make them better suited for handling certain objects of particular types. For example, end-user devices with large screens may be better-suited for watching high-definition video, whereas more portable devices may be better-suited for GPS-based navigation. Some devices may not be able to handle certain types of objects at all. For example, it is presently atypical for a television to have the ability to make phone calls or handle calendar entries, and only some smart televisions can handle hyperlinks.

Switching between these end-user devices in order to make best use of their strengths is often a hassle. For example, a user may encounter a phone number on their workstation, but want to dial the number with their smartphone. In such a situation, a user will often have to manually enter the phone number into their smartphone while reading the number off of their workstation screen. Similarly, a user may encounter an address on their tablet, but wish to navigate to that address using their GPS device. In such a situation, a user may have to manually enter the address into their GPS while reading the address off of their tablet screen.

This hassle can become quite obnoxious if a suitable device for performing the action is not obvious. For example, a user may wish to play a video on their smartphone, only to find that the high-definition video is too large to stream, decode or store locally, for playback. Such a user may then attempt to play the video on their tablet, only to find that their tablet lacks the appropriate codec to decode the video. Thus, the user may attempt to play the video on their smart television, only to find that their smart television does not have a media player app built-in. By the time the user discovers that their workstation has the capability to adequately handle the video, the user will have wasted a significant amount of time experimenting with their other devices.

Even when a user is able to find a device to support the video quickly, the device they find first may be less than optimal. For example, after discovering that their smartphone is unable to play a video file, the user may attempt to play the video on a tablet which supports playback, but lacks the processing resources to render the video smoothly.

Accordingly, a need exists for devices that will collaborate to handle objects encountered by the user in order to make best use of their collective strengths, while mitigating the impact to the user caused by their individual weaknesses.

SUMMARY

In exemplary embodiments of the present disclosure, a network server creates a database storing a list of end-user devices associated with a user, object types that can be handled by the respective end-user devices, and actions that can be performed by the respective end-user devices for handling objects of the respective object types. One of the end-user devices detects that it is unable to handle an object and makes a request to the network server that a different, unspecified device handle the object instead. The network server, having received the request that an unspecified device handle the object, selects a device associated with the user to handle the object based on the database, and invokes that device.

Exemplary embodiments of the disclosure comprise methods, implemented by a network server in a communications network, for assisting devices in handling objects. In one exemplary embodiment, the method comprises creating a database storing a list of end-user devices associated with a user, object types that can be handled by the respective end-user devices, and actions that can be performed by the respective end-user devices for handling objects of the respective object types. The method further comprises receiving, from a first device associated with the user, a request that an unspecified device handle an object, the first device being unable to handle the object. Finally, the method further comprises selecting, based on the database, a second device associated with the user to handle the object; invoking the second device to handle the object.

In some embodiments, selecting the second device comprises determining the type of the object, and determining that the second device is able to perform a first action for handling objects of the determined type. In one embodiment, the method further comprises determining that the second device is able to perform a second action, distinct from the first action, for handling objects of the determined type, and deciding which of the first action and second action is better suited for handling the object, wherein invoking the second device to handle the object comprises indicating the decided action. In one embodiment, the method further comprises determining that the second device is able to perform a second action, distinct from the first action, for handling objects of the determined type, and prompting the first device for which of the first action and second action should be performed for handling the object, wherein invoking the second device to handle the object comprises invoking an action indicated by the first device in response to the prompting. In one embodiment, determining the type of the object comprises evaluating the contents of the object. In one embodiment, selecting the second device further comprises determining that a third device associated with the user is able to perform a third action for handling objects of the determined type, and deciding that the second device is better suited than the third device for handling the object. In one embodiment, selecting the second device further comprises determining that a third device associated with the user is able to perform a third action for handling objects of the determined type, prompting the first device for which of the second device and third device should be invoked for handling the object, and receiving, in response to the prompting, a reply from the first device indicating the second device should be invoked for handling the object.

In some embodiments, selecting the second device comprises determining an action for handling the object; and determining that the second device is able to perform the action. In one embodiment, selecting the second device further comprises determining that a third device associated with the user is able to perform the action; and deciding that the second device is better suited than the third device for handling the object. In one embodiment, selecting the second device further comprises determining that a third device associated with the user is able to perform the action; prompting the first device for which of the second device and third device should be invoked for handling the object; and receiving, in response to the prompting, a reply from the first device indicating the second device should be invoked for handling the object.

Other embodiments comprise methods, implemented by a first end-user device associated with a user, for handling objects. In one exemplary embodiment, the method comprises processing an event related to an object, detecting that the first end-user device is unable to handle the object, and in response, sending, to a network server, a request that an unspecified end-user device handle the object.

In some embodiments, the method further comprises receiving, in response to the request, a prompt for which of a plurality of actions should be performed for handling the object, deciding which of the plurality of actions should be performed for handling the object, and responding to the prompt with the result of the decision.

In some embodiments, the method further comprises receiving, in response to the request, a prompt for which of a plurality of devices associated with the user should be invoked for handling the object, deciding which of the plurality of devices should be invoked for handling the object, and responding to the prompt with the result of the decision.

Other embodiments comprise a network server in a communications network, for assisting devices in handling objects. The network server comprises one or more processing circuits, and one or more communications circuits. The communications circuits are for communicating over the communications network, and are operatively connected to the processing circuits. The processing circuits are configured to create a database storing a list of end-user devices associated with a user, object types that can be handled by the respective end-user devices, and actions that can be performed by the respective end-user devices for handling objects of the respective object types. The communications circuits are configured to receive, from a first device associated with the user, a request that an unspecified device handle an object, the first device being unable to handle the object. The processing circuits are further configured to select, based on the database, a second device associated with the user to handle the object. The communications circuits are further configured to invoke the second device to handle the object.

In some embodiments, the processing circuits are configured to select the second device by determining the type of the object, and determining that the second device is able to perform a first action for handling objects of the determined type. In one embodiment, the processing circuits are further configured to determine that the second device is able to perform a second action, distinct from the first action, for handling objects of the determined type, and decide which of the first action and second action is better suited for handling the object. The communication circuits are configured to invoke the second device to handle the object by indicating the decided action. In one embodiment, the processing circuits are further configured to determine that the second device is able to perform a second action, distinct from the first action, for handling objects of the determined type. The communications circuits are further configured to prompt the first device for which of the first action and second action should be performed for handling the object. In addition, the communications circuits are configured to invoke the second device to handle the object by invoking an action indicated by the first device in response to the prompting. In one embodiment, the processing circuits are configured to determine the type of the object by evaluating the contents of the object. In one embodiment, the processing circuits are further configured to select the second device by determining that a third device associated with the user is able to perform a third action for handling objects of the determined type, and deciding that the second device is better suited than the third device for handling the object. In one embodiment, the processing circuits are further configured to select the second device by determining that a third device associated with the user is able to perform a third action for handling objects of the determined type. The communications circuits are further configured to prompt the first device for which of the second device and third device should be invoked for handling the object, and receive, in response to the prompting, a reply from the first device indicating the second device should be invoked for handling the object.

In some embodiments, the processing circuits are configured to select the second device by determining an action for handling the object; and determining that the second device is able to perform the action. In one embodiment, the processing circuits are further configured to select the second device by determining that a third device associated with the user is able to perform the action; and deciding that the second device is better suited than the third device for handling the object. In one embodiment, the processing circuits are further configured to select the second device by determining that a third device associated with the user is able to perform the action. The communications circuits are further configured to prompt the first device for which of the second device and third device should be invoked for handling the object, and receive, in response to the prompting, a reply from the first device indicating the second device should be invoked for handling the object.

Other embodiments comprise a first end-user device associated with a user, for handling objects. The first end-user device comprises one or more processing circuits and one or more communications circuits, operatively connected to the processing circuits, for communicating over a communications network. The processing circuits are configured to process an event related to an object, and detect that the first end-user device is unable to handle the object. The communications circuits are configured to send, to a network server in response to the detecting by the processing circuits, a request that an unspecified end-user device handle the object.

In some embodiments, the communications circuits are further configured to receive, in response to the request, a prompt for which of a plurality of actions should be performed for handling the object. The processing circuits are further configured to decide which of the plurality of actions should be performed for handling the object. The communications circuits are further configured to respond to the prompt with the result of the decision.

In some embodiments, the communications circuits are further configured to receive, in response to the request, a prompt for which of a plurality of devices associated with the user should be invoked for handling the object. The processing circuits are further configured to decide which of the plurality of devices should be invoked for handling the object. The communications circuits are further configured to respond to the prompt with the result of the decision.

BRIEF DESCRIPTION OF THE DRAWINGS

FIG. 3 illustrates the contents of an exemplary database according to one or more embodiments of the present disclosure.

DETAILED DESCRIPTION

Figure 1:
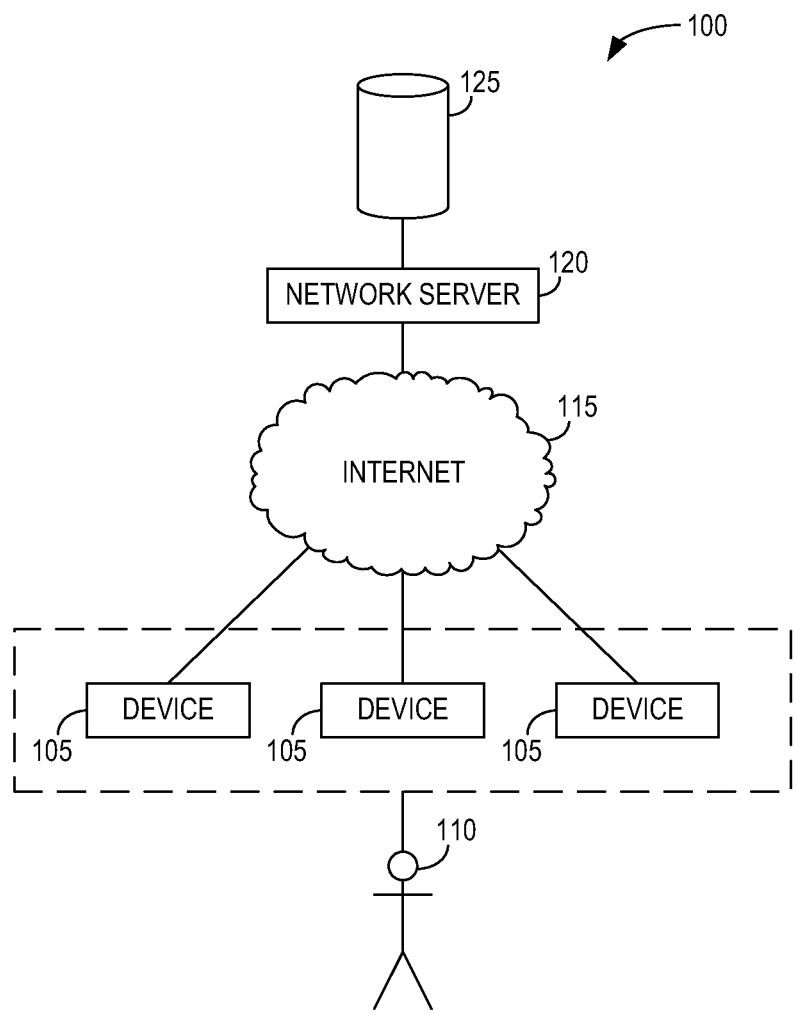
FIG. 1 illustrates an exemplary communications network according to one or more embodiments of the present disclosure.

FIG. 1 illustrates an exemplary communications network 100 that enables end-user devices 105 to communicate with each other. Examples of end-user devices 105 include smart phones, tablets, personal computers, laptops, network-enabled televisions, and network-enabled audio receivers. Each of the end-user devices 105 is associated with the same user 110 and is able to communicate over the Internet 115 or other network with a network server 120.

The network server 120 is useful for assisting end-user devices 105 in handling objects. To do so, network server 120 creates, and makes use of, a database 125. This database 125 stores information related to devices 105 and their capabilities. In particular, database 125 can store information related to one or more actions that the device 105 can perform in order to handle objects of particular types.

Figure 2:
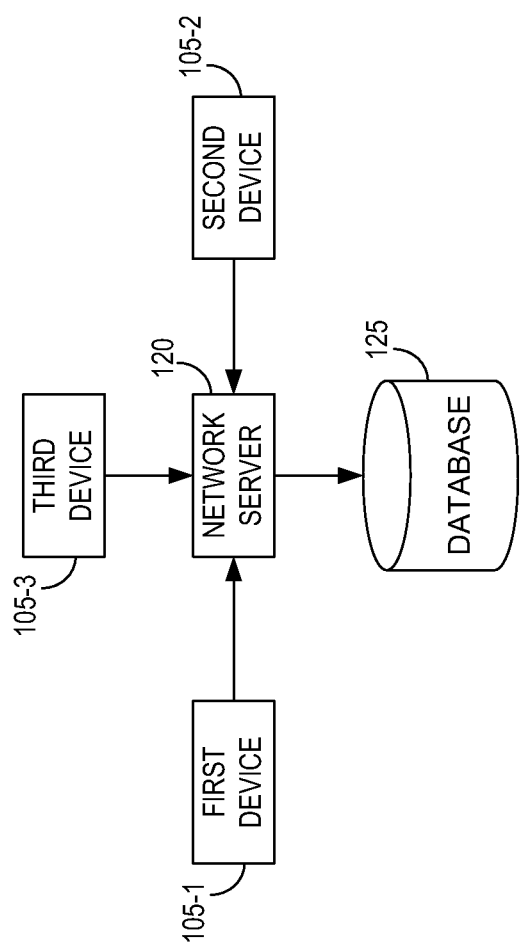
FIG. 2 illustrates creating a database, according to one or more embodiments of the present disclosure.

FIG. 2 illustrates creating such a database 125. In some embodiments, each of a first device 105-1, second device 105-2, and third device 105-3 reports their respective capabilities to network server 120. In some embodiments, the devices 105 report the capabilities of other devices 105. These reports can be unsolicited, or can be made in response to a request made by the network server 120, user 110, or other entity. The network server 120 uses the information in these reports to populate and/or generate records in database 125 for future use in assisting the devices 105 in handling objects.

FIG. 3 illustrates one example 200 of the contents and organization 200 of database 125. Database 125 may contain a device list 210 for storing records 215 about the hardware and/or software of the devices 105 themselves. In such a device list 210, each device 105 is assigned a unique device ID that allows the devices to be easily referenced and indexed within the database 125. Information in the device list 210 can include a description of the model of the device, whether certain hardware is present, and if so, various details regarding the present hardware. For example, record 215-1 in the device list 210 stores the hardware information for a device 105 that has been allocated Device ID 0. Device ID 0 is an Xperia Z Ultra Smartphone having a phone, Global Positioning System (GPS) and a 6.4 inch screen. Information in the device list 210 can also include one or more users associated with each device 105.

Database 125 may also contain an action list 220 for storing records 225 about actions that devices 105 can perform for handling objects of particular types. Record 225-1 indicates that Device ID 0 is able to perform a dial action for phone number objects. Since device list 210 indicates that Device ID 0 has a phone, record 225-1 is consistent with record 215-1. Similarly, record 225-3 indicates that Device ID 0 is able to perform a navigation action for address objects. Since device list 210 indicates that Device ID 0 has a GPS, the information in record 225-3 is consistent with the information in record 215-1.

In some embodiments, database 125 may be created by populating device list 210, and generating action list 220 based on the device list 210. For example, each of the devices 105 can report their hardware and/or software attributes to network server 120. Alternatively, the devices 105 may report identifying information, such as their make, model, and/or serial number, and network server 120 can use the identifying information to retrieve their hardware and/or software attributes. Once the hardware and/or software attributes are known, network server 120 can populate the device list 210 with this information. Once populated, network server can examine each record 215 in the device list 210, and generate records 225 in the action list 220. For example, because 215-1 indicates that Device ID 0 has a phone, network server 120 can generate record 225-1 pertaining to dialing phone numbers. Similarly, records 215-1, 215-2, 215-3 that indicate the device has a screen, can cause records 225-4, 225-6, 225-8 to be generated reflecting that Device ID 0, 1, 2 can each play videos. Thus, the action list 220 can be generated from information that adequately describes the devices 210.

Similarly, database 125 may be created by populating the action list 220, and generating the device list 210 based, at least in part, on the action list 220. For example, each of the devices 105 can report the object types they can handle, and the actions they can perform on those object types. Once the action list 220 is populated, all of the devices that can dial phone numbers will be represented in the device list 210 as having a phone. Similarly, all the devices that can navigate to addresses will be represented in the device list 210 as having a GPS. Thus, at least some of the device list 210 can be generated from information describing the actions the devices 105 can perform on objects of particular types. Alternatively, the database 125 can be fully populated or generated using information provided by the devices 105, discovered by the network server 120, or a hybrid of any of the approaches discussed herein.

Figure 4:
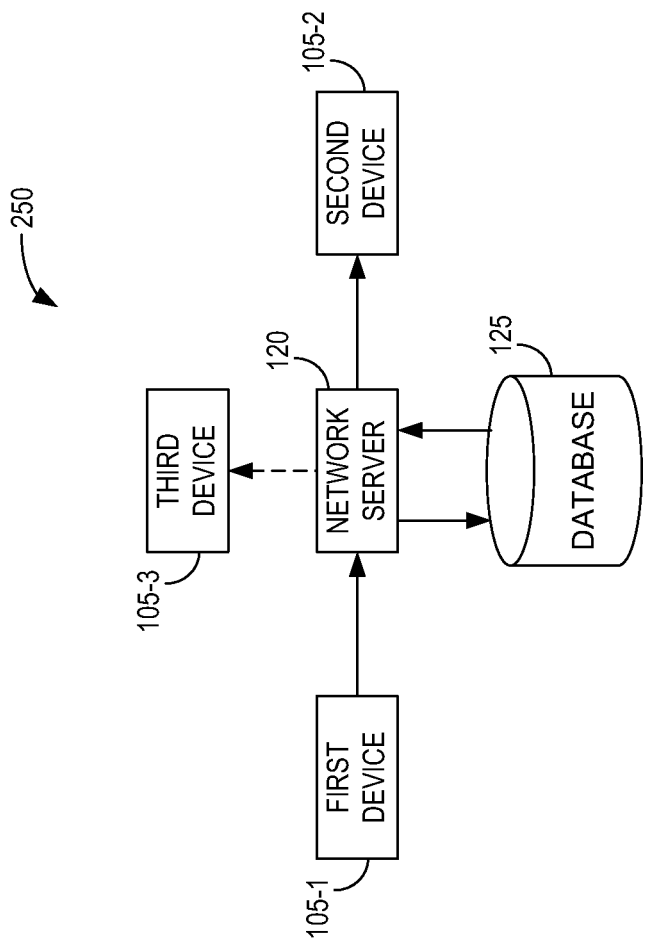
FIG. 4 illustrates an example of a network server assisting a device in handling an object by using a database, according to one or more embodiments of the present disclosure.

Once the database 125 has been created, it can be used by the network server 120 to assist devices 105 in handling objects. FIG. 4 illustrates an example 250 of network server 120 assisting a first device 105-1 in handling an object by invoking a second device 105-2. In the example 250, the devices 105 are all associated with user 110. The first device 105-1, having processed an event related to an object, detects that it is unable to handle the object. Accordingly, first device 105-1 sends a request to network server 120 requesting that an unspecified device, also associated with the user 110, handle the object. Network server 120, having received the request, consults the database 125. Based, at least in part, on the information stored within, network server 120 selects second device 105-2 rather than third device 105-3 to handle the object. Having selected second device 105-2, network server 120 invokes the second device 105-2 to handle the object.

In some embodiments, the network server determines the type of the object and discovers that second device 105-2 is the only device 105 associated with user 110 and represented in the database 125 that can handle objects of the determined type. For example, network server 120 might examine the contents of the object and see that it is as string of 10 digits, and recognize this as a phone number. Upon consulting the database 125, second device 105-2 could be the only device 105 associated with the user 110 that can perform an action for phone numbers. Such a scenario is illustrated by FIG. 3 if second device 105-2 were Device ID 0. In such a case, network server 120 will invoke the second device 105-2 because it is the only device option available to network server 120.

In some embodiments, the network server determines the type of the object and discovers that there is only one action in the database associated with that object type. For example, the only action associated with phone number objects in action list 220 is a dial action. In such a case, network server 120 will invoke a device 105 to perform the dial action because it is the only action option available to network server 120.

In some embodiments, both second device 105-2 and third device 105-3 can handle the object, while the first device 105-1 cannot. For example, the object could be a video with a resolution that is higher than the screen on first device 105-1 can support, the first device 105-1 could lack an appropriate codec to decode the video, and the video could be in a format that does not support streaming and is too large to be stored in the first device's 105-1 local memory. Second device 105-2 and third device 105-3, however, may each have large screens, an appropriate codec, and sufficient memory storage to locally play the video. In such a case, network server 120 can decide that second device 105-2 is better suited than third device 105-3 for handling the object based on the information in the database 125. For example, second device 105-2 could have an 11.6 inch screen (as represented by Device ID 2 of FIG. 3) and third device 105-3 could have a 10.1 inch screen (as represented by Device ID 1 of FIG. 3). Accordingly, network server 120 could decide that second device 105-2 is better suited than the third device 105-3 for handling the video because second device 105-2 has a larger screen. The decision could also be based on network server 120 prioritizing certain devices 105 over others according to a policy, configuration, user preference, or default setting.

Alternatively, instead of the network server 120 deciding which device is better suited when more than one device 105 is able to perform an action for handling the object, the network server 120 could prompt the first device 105-1 to decide which of the devices 105-2, 105-3 should be invoked. The first device 105-1 can then decide, without user 110 intervention, based on prioritizing certain devices 105 over others according to a policy, configuration, user preference, or default setting. Alternatively, the first device 105-1 can leave the decision up to the user 110 by prompting the user 110 for a decision via a user interface of the first device 105-1. The network server 120 would then invoke the second device 105-2 as a consequence of the first device's 105-1 decision.

In some embodiments, the network server 120 determines that more than one action is available for handling the object. For example, if second device 105-2 were represented by Device ID 0, and the object were an address object, second device 105-2 would be able to handle the object by locating the address on a software map, or would be able to handle the object by navigating to the address using its GPS. In such a case, network server 120 can decide that the navigation action is better suited than the locating action for handling the object. The decision could be based on network server 120 prioritizing certain actions over others according to a policy, configuration, user preference, or default setting. The decision could also be based on the particular object being handled. For example, if the address is just a city name, the network server 120 might decide that the locate action is better suited. However, if the address is a full mailing address, the network server 120 might decide that the navigate action is better suited.

Alternatively, instead of the network server 120 deciding which action is better suited when more than one action can be performed for handling the object, the network server 120 could prompt the first device 105-1 to decide which of the actions should be performed. The first device 105-1 can then decide, without user 110 intervention, based on prioritizing certain actions over others according to a policy, configuration, user preference, or default setting. Alternatively, the first device 105-1 can leave the decision up to the user 110 by prompting the user 110 for a decision via a user interface of the first device 105-1. The network server 120 would then invoke the second device 105-2 to perform the action as a consequence of the first device's 105-1 decision.

In some embodiments, the object could be handled by different devices performing different actions. As discussed above, the network server 120 can either decide, or prompt, the first device 105-1 for either which device, or which action, or which device and action, should be invoked or performed to handle the object. One of ordinary skill will recognize the different combinations and permutations of these actions, object types, and devices in which the above techniques might be useful.

Figure 5:
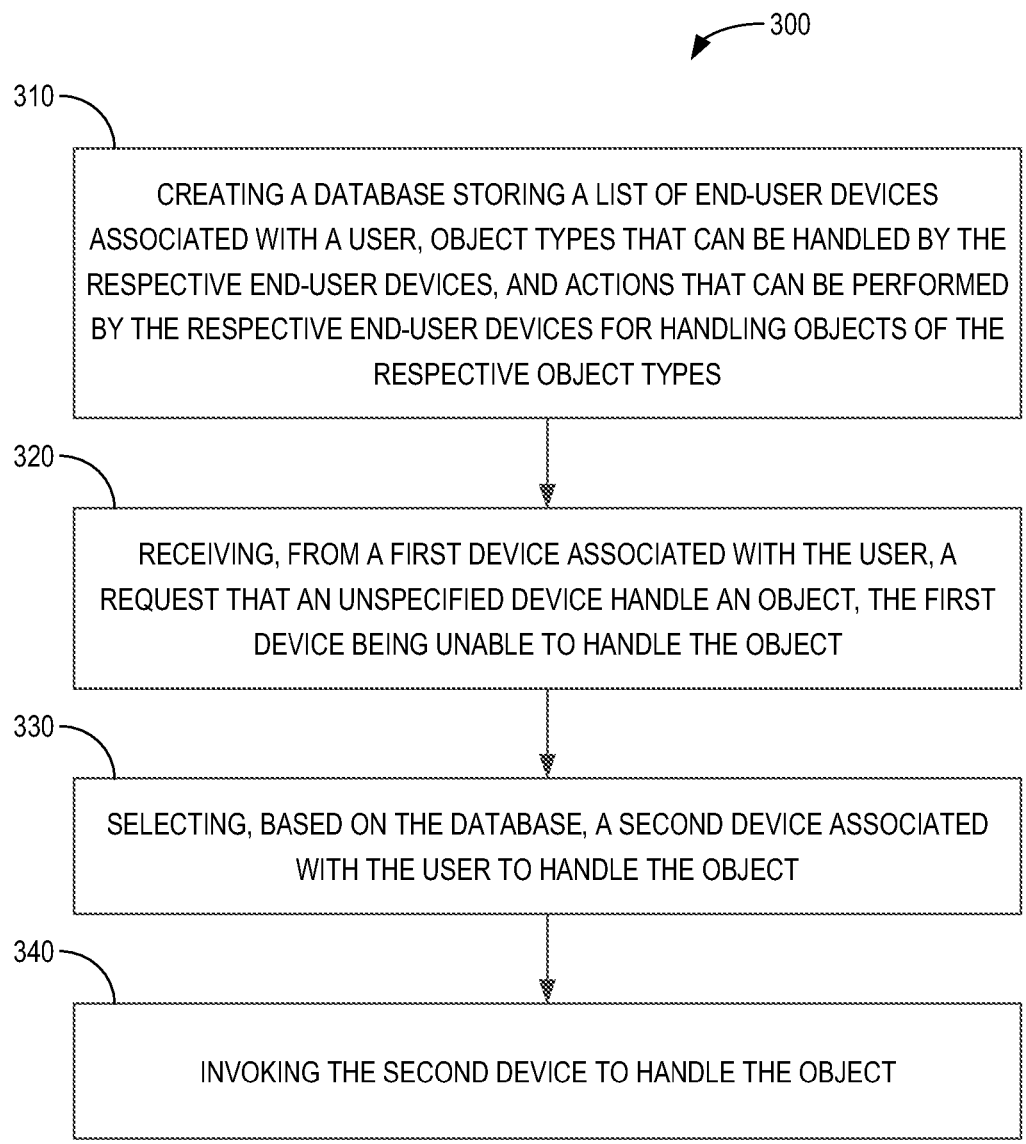
FIG. 5 illustrates an exemplary method, implemented by a network server, for assisting devices in handling objects, according to one or more embodiments of the present disclosure.

In keeping with the above, FIG. 5 illustrates an exemplary method 300, implemented by a network server 120 in a communications network 100, for assisting devices 105 in handling objects. The method 300 comprises creating a database 125 storing a list of end-user devices 105 associated with a user 110, object types that can be handled by the respective end-user devices 105, and actions that can be performed by the respective end-user devices 105 for handling objects of the respective object types (block 310). The method 300 further comprises receiving, from a first device 105-1 associated with the user 110, a request that an unspecified device 105 handle an object, the first device 105-1 being unable to handle the object (block 320). The method 300 further comprises selecting, based on the database 125, a second device 105-2 associated with the user 110 to handle the object (block 330). Finally, the method 300 further comprises invoking the second device 105-2 to handle the object (block 340).

Figure 6:
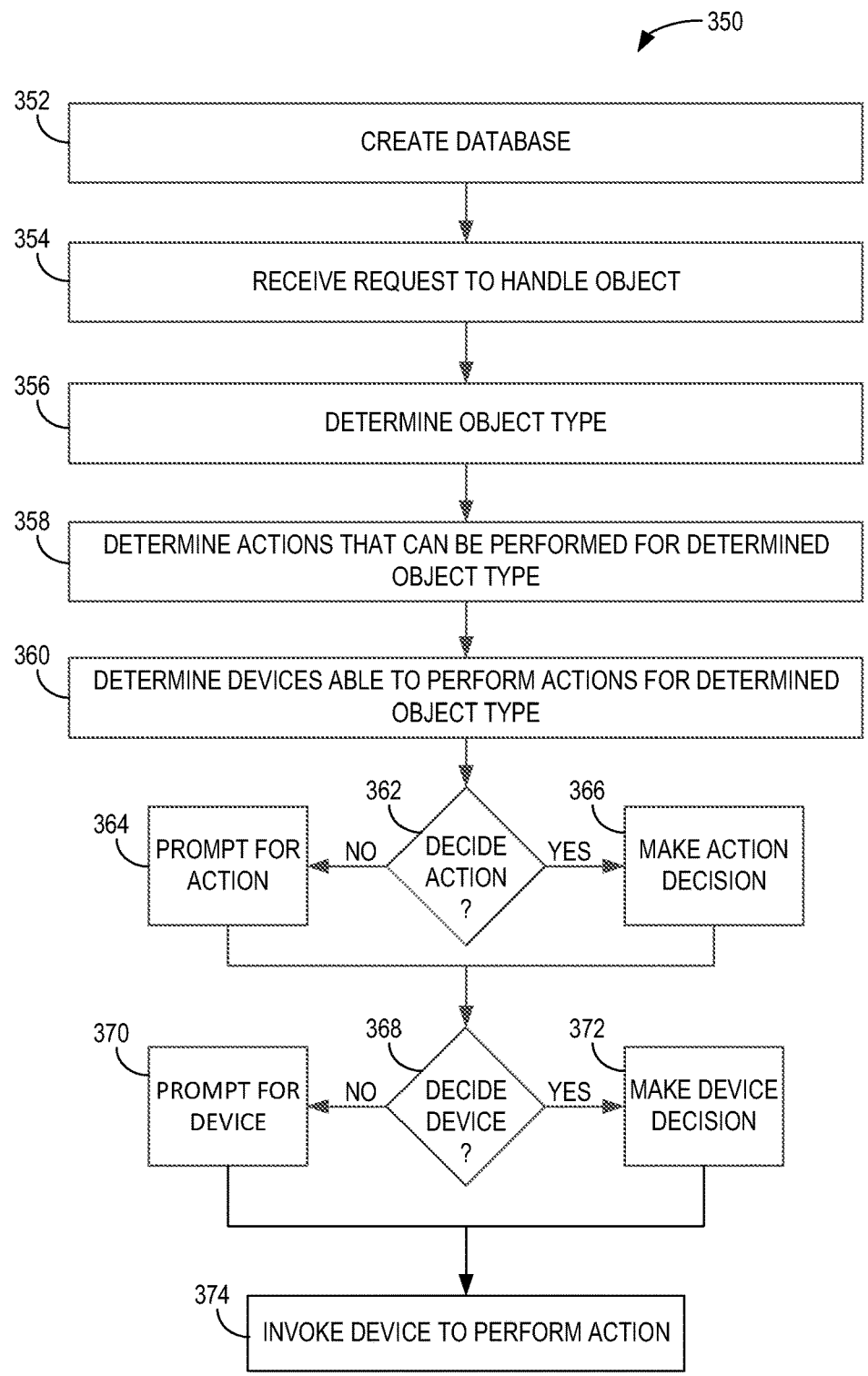
FIG. 6 illustrates a further exemplary method, implemented by a network server, for assisting devices in handling objects, according to one or more embodiments of the present disclosure.

FIG. 6 illustrates a more detailed method 350 for the network server 120 to assist devices 105 in handling objects. First, the network server 120 creates a database 125 storing a list of end-user devices 105 associated with a user 110, object types that can be handled by the respective end-user devices 105, and actions that can be performed by the respective end-user devices 105 for handling objects of the respective object types (block 352). Then, network server 120 receives, from a first device 105-1 associated with the user 110, a request that an unspecified device 105 handle an object, the first device 105-1 being unable to handle the object (block 354). The network server 120 then determines the type of the object, such as by inspecting the contents of the object (block 356). Next, the network server 120 determines the actions that can be performed for handling objects of the determined type (block 358). Then, the network server 120 determines the devices that are able to perform actions for the determined object type (block 360). The network server 120 can then decide (block 362) whether to prompt the first device 105-1 for which of a plurality of actions should be performed for handling the object (block 364), or to decide which action should be performed for handling the object (block 366). If there is only one action available, the network server 120 can decide the action without prompting (block 366). The network server 120 then decides (block 368) whether to prompt the first device 105-1 for which of a plurality of devices 105 should be invoked for handling the object (block 370) or to decide which device is better suited for handling the object (block 372). If there is only one device that can handle the object, the network server 120 can select the device without prompting (block 372). Finally, the network server 120 will invoke the selected device to handle the object according to the determined action (block 374).

Figure 7:
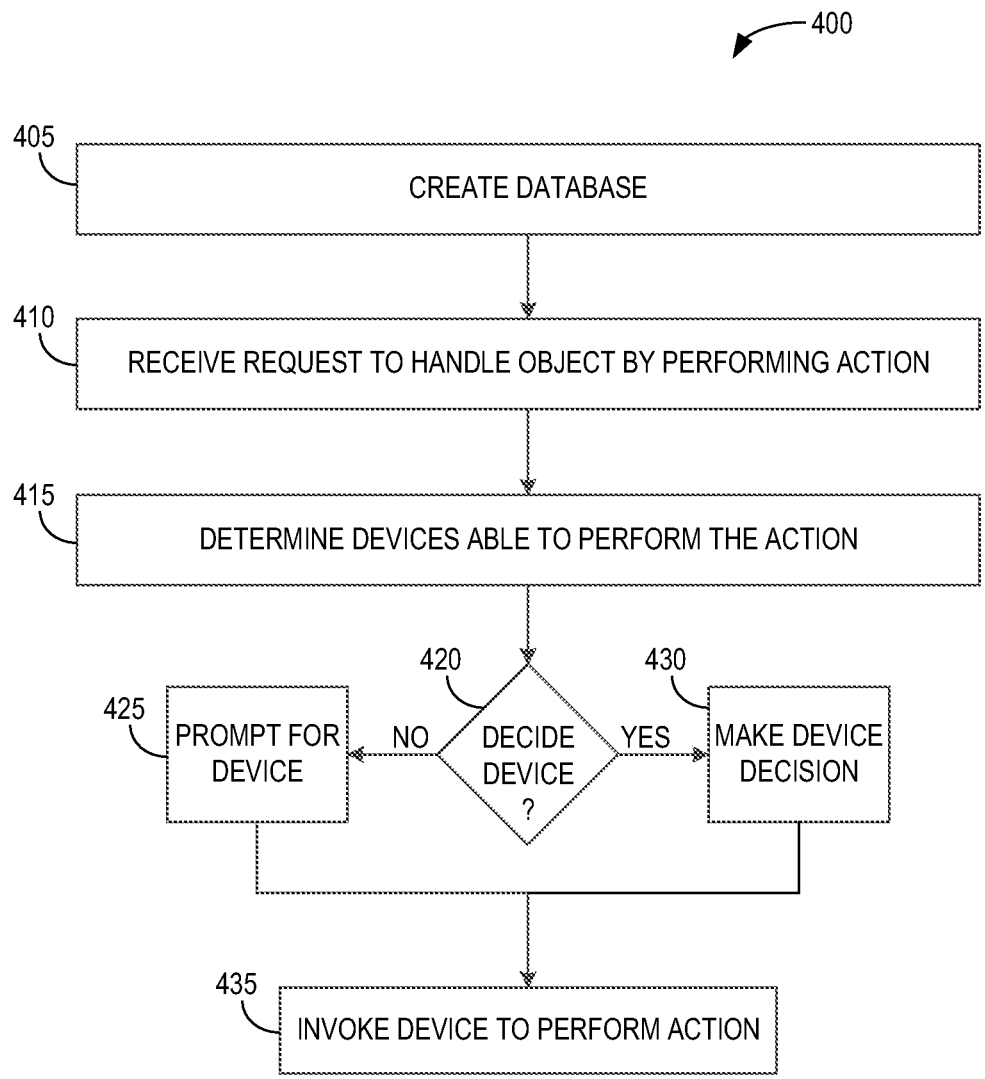
FIG. 7 illustrates a different exemplary method, implemented by a network server, for assisting devices in handling objects, according to one or more embodiments of the present disclosure.

In some embodiments, the network server 120 will receive a request that an unspecified device handle an object in which the action to be performed for that object is specified. FIG. 7 illustrates a different exemplary method 400 in which the action is specified. First, the network server 120 creates a database 125 storing a list of end-user devices 105 associated with a user 110, object types that can be handled by the respective end-user devices 105, and actions that can be performed by the respective end-user devices 105 for handling objects of the respective object types (block 405). Next, the network server 120 receives, from a first device 105-1 associated with a user 110, a request that an unspecified device 105 handle an object, the first device 105-1 being unable to handle the object (block 410). The request comprises the action to be performed for handling the object, thus allowing the action for handling the object to be determined from the request, and without having to consult the database 125. The network server 120 will then determine the devices 105 that are able to perform the action by referencing the database 125 (block 415). The network server 120 then decides (block 420) whether to prompt the first device 105-1 for which of a plurality of devices 105 should be invoked for handling the object (block 425) or to decide which device is better suited for handling the object (block 430). Once the device has been selected, the network server 120 will then invoke the selected device to handle the object according to the action (block 435).

Figure 8:
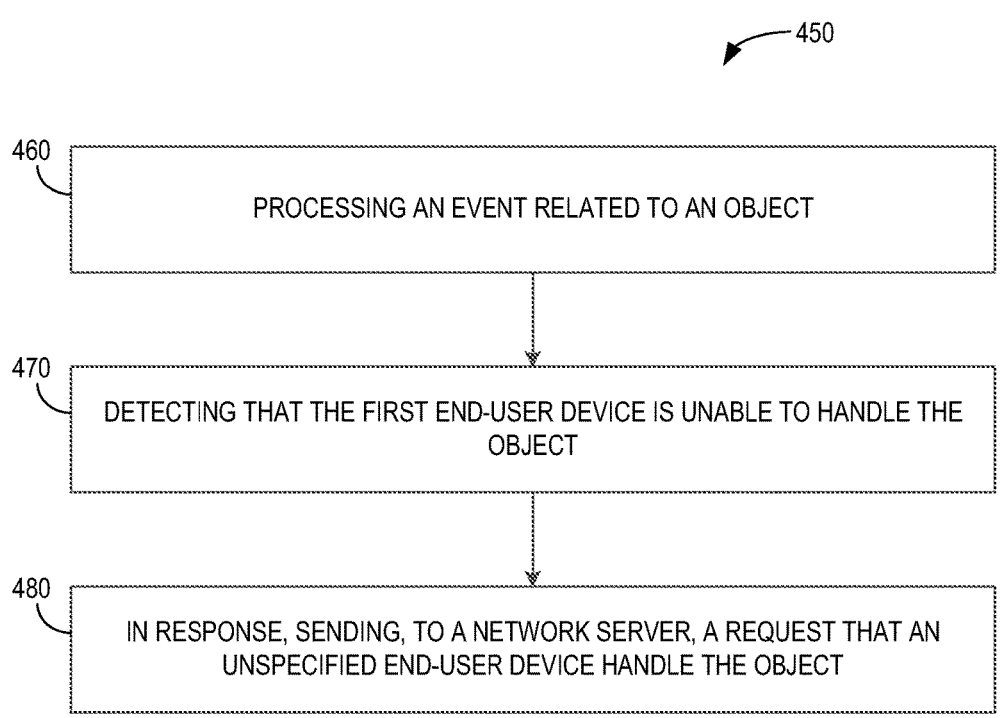
FIG. 8 illustrates an exemplary method, implemented by an end-user device associated with a user, for handling objects, according to one or more embodiments of the present disclosure.

FIG. 8 illustrates an exemplary method 450, implemented by a first end-user device 105-1 associated with a user 110, for handling objects. The method 450 comprises processing an event related to an object (block 460). The method 450 further comprises detecting that the first end-user device 105-1 is unable to handle the object (block 470). Finally, the method 450 further comprises, in response, sending, to a network server 120, a request that an unspecified end-user device 105 handle the object (block 480).

Figure 9:
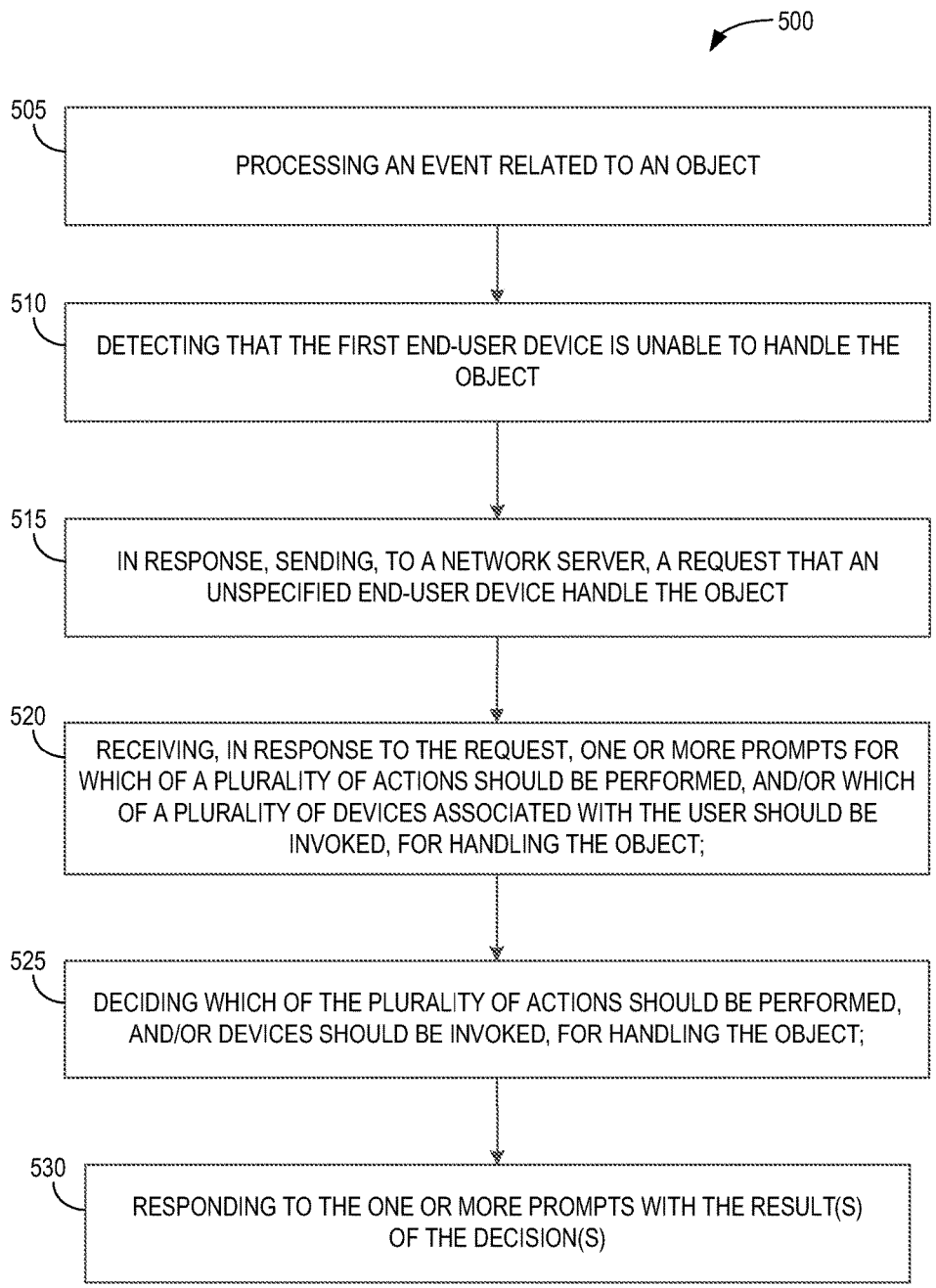
FIG. 9 illustrates a more detailed method, implemented by an end-user device associated with a user, for handling objects, according to one or more embodiments of the present disclosure.

FIG. 9 illustrates a more detailed method 500, implemented by a first end-user device 105-1 associated with a user 110, for handling objects. First, the end-user device 105-1 processes an event related to an object (block 505). This processing causes the first end-user device 105-1 to detect that it is unable to handle the object (block 510). Thus, in response, the first end-user device 105-1 sends, to a network server 120, a request that an unspecified end-user device 105 handle the object (block 480). The end-user device 105-1 then receives, in response to the request, one or more prompts for which of a plurality of actions should be performed, and/or which of a plurality of devices associated with the user should be invoked, for handling the object (block 520). Accordingly, the first end-user device 105-1 will decide which of the plurality of actions should be performed, and/or devices should be invoked, for handling the object (block 525). Finally, the first end-user device 105-1 will respond to the one or more prompts with the result(s) of the decision(s) (block 530).

Figure 10:
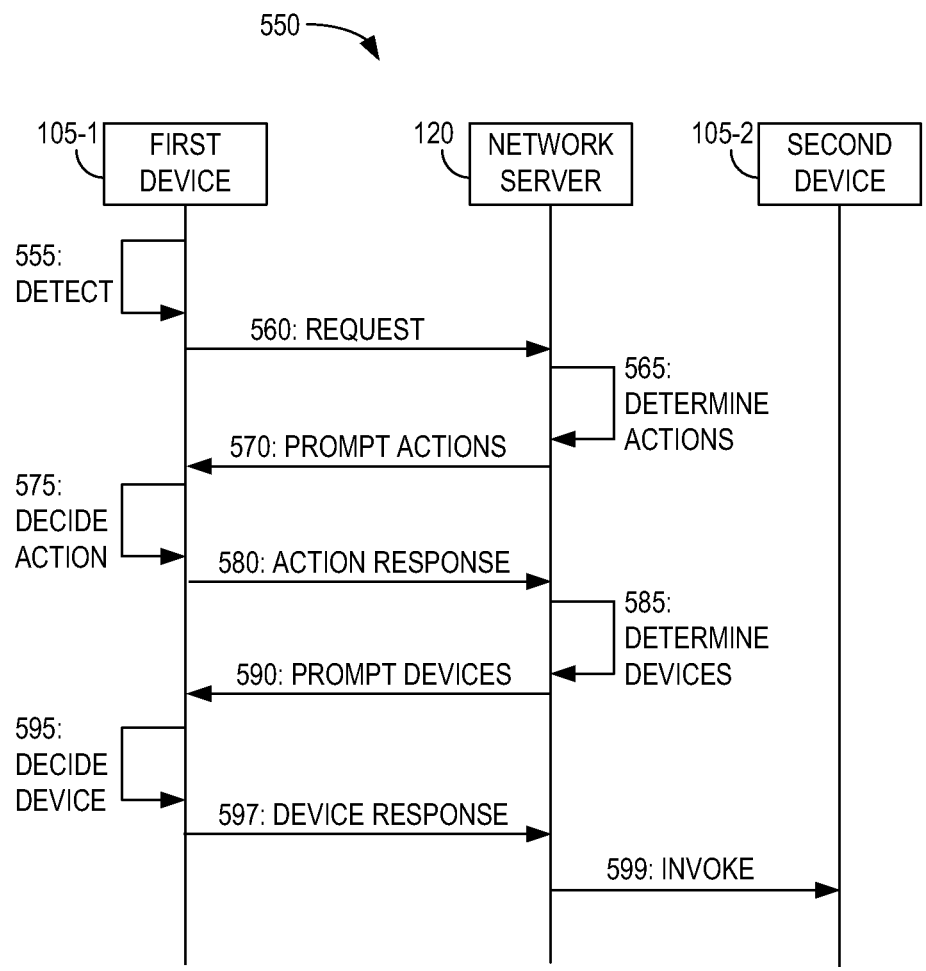
FIG. 10 illustrates messaging within the communications network according to one or more embodiments of the present disclosure.

FIG. 10 illustrates messaging 550 within the communications network 100 between the first device 105-1, network server 120, and second device 105-2 according to one or more embodiments of the present disclosure. Upon detecting that the first device 105-1 is unable to handle an object (555), the first device 105-1 will send, to network server 120, a request that an unspecified end-user device 105 handle the object (560). The network server 120 will receive this request 120 and determine that a plurality of actions may be employed for handling the object (565). Network server 120 will then prompt first device 105-1 for which of the plurality of actions should be performed for handling the object (570). The first device 105-1, having received the prompt will decide which of the plurality of actions should be performed for handling the object (575), and respond to the prompt with the result of the decision (580). The network server 120, having received the response concerning the action to be performed, will then determine that a plurality of devices 105 associated with the user 110 are capable of performing the action (585). Network server 120 will then prompt the first device 105-1 for which of the plurality of devices 105 associated with the user 110 should be invoked for handling the object (590). The first device 105-1, having received the prompt will decide which of the plurality of devices 105 associated with the user 110 should be invoked for handling the object (595), and respond to the prompt with the result of the decision (597). In this example, the first device 105-1 decides that the second device 105-2 should be invoked to handle the object. Network server 120, having received the response, will invoke the second device 105-2 to handle the object according to the decisions of the first device 105-1 (599). Thus, the invoking of the second device 105-2 will comprise invoking the action indicated by the first device 105-1.

Figure 11:
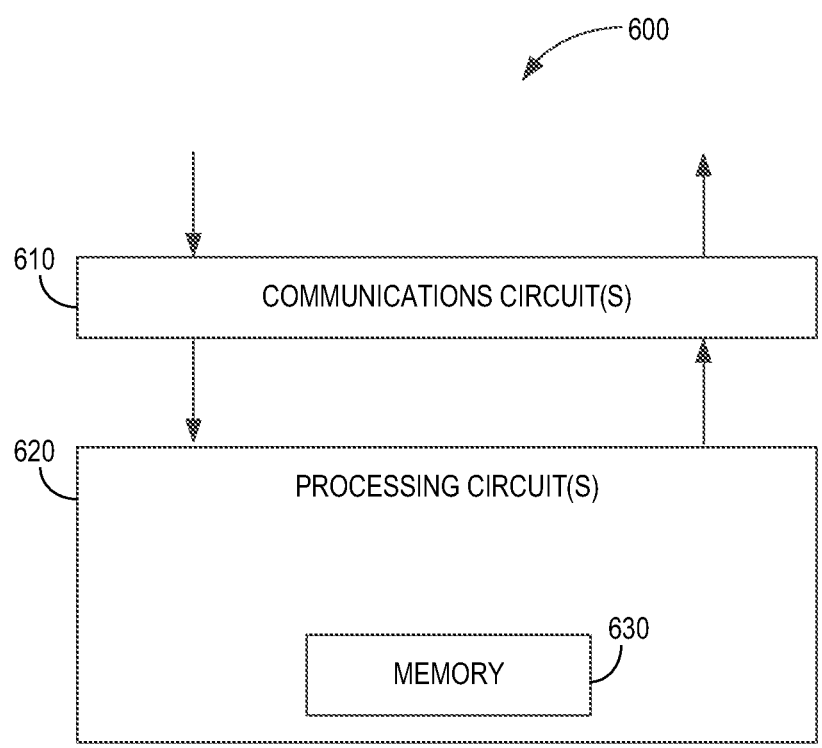
FIG. 11 illustrates exemplary hardware useful for implementing the network server and end-user devices.

FIG. 11 illustrates exemplary hardware 600 useful for implementing the first end-user device 105-1 and network server 120 disclosed herein. The hardware 600 comprises one or more communications circuits 610 useful for communicating over a network with other computing devices. The hardware 600 further comprises one or more processing circuits 620 operatively connected to the communications circuits 610. The processing circuits 620 comprise a memory 630.

When hardware 600 is used to implement the network server 120, the processing circuits 620 are configured to create a database 125 storing a list of end-user devices 105 associated with a user 110, object types that can be handled by the respective end-user devices 105, and actions that can be performed by the respective end-user devices 105 for handling objects of the respective object types. The communications circuits 610 are configured to receive, from a first device 105-1 associated with the user 110, a request that an unspecified device 105 handle an object, the first device 105-1 being unable to handle the object. The processing circuits 620 are further configured to select, based on the database 120, a second device 105-2 associated with the user 110 to handle the object. Finally, the communications circuits 610 are further configured to invoke the second device 105-2 to handle the object. The memory is useful for storing the database 125 in its entirety, or storing subsets of the database 125 returned in response to database 125 queries.

When hardware 600 is used to implement the first end-user device 105-1, the processing circuits 620 are configured to process an event related to an object and detect that the first end-user device 105-1 is unable to handle the object. The communications circuits 610 are configured to send, to a network server 120 in response to the detecting by the processing circuits 620, a request that an unspecified end-user device 105 handle the object. Memory 630 is useful for storing the object.

Those skilled in the art will appreciate that the various methods and processes described herein may be implemented using various hardware configurations that generally, but not necessarily, include the use of one or more microprocessors, microcontrollers, digital signal processors, or the like, coupled to memory storing software instructions or data for carrying out the techniques described herein. In particular, those skilled in the art will appreciate that the circuits of various embodiments of the router may be configured in ways that vary in certain details from the broad descriptions given above. For instance, one or more of the processing functionalities discussed above may be implemented using dedicated hardware, rather than a microprocessor configured with program instructions. Such variations, and the engineering tradeoffs associated with each, will be readily appreciated by the skilled practitioner. Since the design and cost tradeoffs for the various hardware approaches, which may depend on system-level requirements that are outside the scope of the present disclosure, are well known to those of ordinary skill in the art, further details of specific hardware implementations are not provided herein.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A method comprising:
   receiving, at a network server, device capability information for each of at least three electronic devices associated with a user;
   responsive to receiving the device capability information, creating, by the network server based on the received device capability information, a database storing a list of the devices associated with the user, data object types that the respective devices are configured to handle, and actions that the respective devices are configured to carry out for handling data objects of the respective data object types;
   receiving, from a first of the devices associated with the user, a request that an unspecified device handle a data object upon which software action may be taken according to data object type, the first device being unable to handle the data object due to a hardware or software limitation of the first device;
   selecting, based on the created database and according to relative suitability of the devices to handle the data object, a second of the devices associated with the user to handle the data object rather than a third of the devices associated with the user; and
   invoking the second device to handle the data object.

2. The method of claim 1, wherein selecting the second device comprises:
   determining the type of the data object;
   determining that the second device is able to perform a first action for handling data objects of the determined type.

3. The method of claim 2, further comprising:
   determining that the second device is able to perform a second action, distinct from the first action, for handling data objects of the determined type;
   deciding which of the first action and second action is better suited for handling the data object;
   wherein invoking the second device to handle the data object comprises indicating the decided action.

4. The method of claim 2, further comprising:
   determining that the second device is able to perform a second action, distinct from the first action, for handling data objects of the determined type;
   prompting the first device for which of the first action and second action should be performed for handling the data object;
   wherein invoking the second device to handle the data object comprises invoking an action indicated by the first device in response to the prompting.

5. The method of claim 2, wherein determining the type of the data object comprises evaluating the contents of the data object.

6. The method of claim 2, wherein selecting the second device further comprises:
   determining that the third device associated with the user is able to perform an action for handling data objects of the determined type;
   deciding that the second device is better suited than the third device for handling the data object.

7. The method of claim 1, wherein selecting the second device comprises:
   determining an action for handling the data object; and
   determining that the second device is able to perform the action.

8. The method of claim 7, wherein selecting the second device further comprises:

determining that the third device associated with the user is able to perform the action; and deciding that the second device is better suited than the third device for handling the data object.

9. The method of claim 7, wherein selecting the second device further comprises:
determining that the third device associated with the user is able to perform the action;
prompting the first device for which of the second device and third device should be invoked for handling the data object;
receiving, in response to the prompting, a reply from the first device indicating the second device should be invoked for handling the data object.

10. A network server in a communications network comprising:
one or more processing circuits configured to, responsive to receiving device capability information for each of at least three electronic devices associated with a user, create a database storing a list of the devices associated with the user, data object types that the respective devices are configured to handle, and actions that the respective devices are configured to carry out for handling data objects of the respective data object types based on the received device capability information;
one or more communications circuits for communicating over the communications network, operatively connected to the processing circuits, and configured to receive, from a first of the devices associated with the user, a request that an unspecified device handle a data object, the first device being unable to handle the data object due to a hardware or software limitation of the first device;
wherein the processing circuits are further configured to select, based on the created database and according to relative suitability of the devices to handle the data object, a second of the devices associated with the user to handle the data object rather than a third of the devices associated with the user; and
wherein the communications circuits are further configured to invoke the second device to handle the data object.

11. The network server of claim 10, wherein the processing circuits are configured to select the second device by:
determining the type of the data object;
determining that the second device is able to perform a first action for handling data objects of the determined type.

12. The network server of claim 11:
wherein the processing circuits are further configured to:
determine that the second device is able to perform a second action, distinct from the first action, for handling data objects of the determined type;
decide which of the first action and second action is better suited for handling the data object;

wherein the communication circuits are configured to invoke the second device to handle the data object by indicating the decided action.

13. The network server of claim 11:
wherein the processing circuits are further configured to determine that the second device is able to perform a second action, distinct from the first action, for handling data objects of the determined type;
wherein the communications circuits are further configured to prompt the first device for which of the first action and second action should be performed for handling the data object;
wherein the communications circuits are configured to invoke the second device to handle the data object by invoking an action indicated by the first device in response to the prompting.

14. The network server of claim 11, wherein the processing circuits are configured to determine the type of the data object by evaluating the contents of the object.

15. The network server of claim 11, wherein the processing circuits are further configured to select the second device by:
determining that the third device associated with the user is able to perform an action for handling data objects of the determined type;
deciding that the second device is better suited than the third device for handling the data object.

16. The network server of claim 10, wherein the processing circuits are configured to select the second device by:
determining an action for handling the data object; and
determining that the second device is able to perform the action.

17. The network server of claim 16, wherein the processing circuits are further configured to select the second device by:
determining that the third device associated with the user is able to perform the action; and
deciding that the second device is better suited than the third device for handling the data object.

18. The network server of claim 16:
wherein the processing circuits are further configured to select the second device by determining that the third device associated with the user is able to perform the action;
wherein the communications circuits are further configured to:
prompt the first device for which of the second device and third device should be invoked for handling the data object;
receive, in response to the prompting, a reply from the first device indicating the second device should be invoked for handling the data object.

* * * * *